Dec. 11, 1956 A. W. SEYFRIED 2,773,997
HANDLE MOUNTING FOR MOTOR DRIVEN POWER UNIT
Filed Jan. 16, 1956
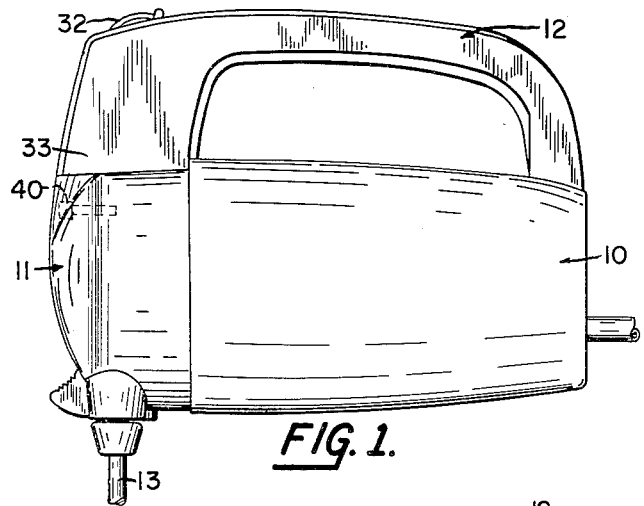
FIG. 1.
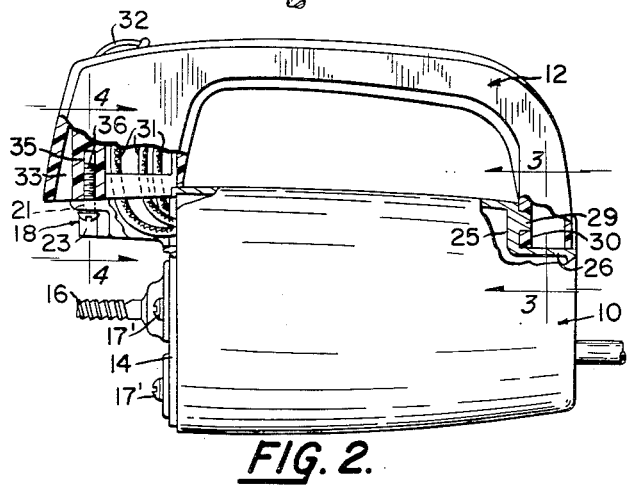
FIG. 2.
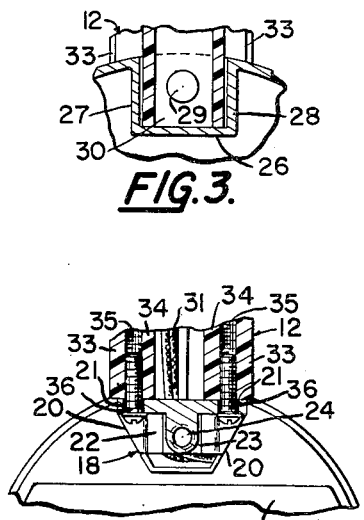
FIG. 3.
FIG. 4.
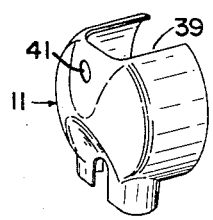
FIG. 5.
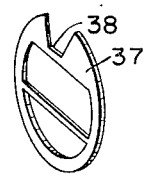
FIG. 6.
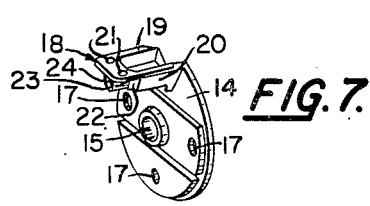
FIG. 7.
INVENTOR.
ARTHUR W. SEYFRIED
BY Bertha L. MacGregor
ATTORNEY United States Patent Office 2,773,997
Patented Dec. 11, 1956

2,773,997

HANDLE MOUNTING FOR MOTOR DRIVEN POWER UNIT

Arthur W. Seyfried, Racine, Wis., assignor to Scovill Manufacturing Company, Waterbury, Conn., a specially chartered corporation of Connecticut Application January 16, 1956, Serial No. 559,235

10 Claims. (Cl. 310—50)

This invention relates to handle mounting means for motor driven power units, and more particularly to means for mounting on a motor driven food mixer a handle designed to receive the switch mechanism which controls the electrical operation of the motor.

The main object of the invention is to provide efficient and simple means, entirely concealed, for connecting the switch containing handle to the power unit of a food mixer by the use of only two screws which constitute the only fastening means separate from the handle and power unit required for this purpose. The assembling of the motor housing, switch mechanism, handle and gear housing of the power unit is greatly simplified and expedited by reason of the construction herein shown and described.

Other objects and advantages will appear from the drawings and following specification.

In the drawings:

Fig. 1 is a side elevational view of a food mixer embodying my invention.

Fig. 2 is a view similar to Fig. 1, but showing the motor casing with the gear housing removed therefrom, and part of the handle broken away to expose handle mounting means.

Fig. 3 is a transverse vertical sectional view through the rear end of the handle and motor housing, taken in the plane of the line 3—3 of Fig. 2.

Fig. 4 is a transverse vertical sectional view through the front end mounting of the handle, taken in the plane of the line 4—4 of Fig. 2.

Figs. 5, 6 and 7 are perspective views, respectively, of the gear housing, gasket, and motor casing end cover, detached from the rest of the structure.

In the drawings, I have shown the handle mounting of my invention as embodied in a motor driven food mixer which comprises a motor housing 10, attached gear housing 11, handle 12 and beater shafts 13.

The forward end of the motor housing 10 is closed by a special cover 14 provided with a central aperture 15 through which the motor shaft 16 projects into the gear housing 11. The motor shaft 16 drives the beater shafts 13 through worm gears and worm gear shafts (not shown) as is well understood in the art.

The cover 14 is rigidly connected to the motor housing 10 by suitable fastening means 17' through the holes 17 (Fig. 7) and has a U-shaped recess cut out of the central upper portion which communicates interiorly with a bracket 18 which projects integrally forwardly from the recessed portion of the cover 14.

The bracket 18 has a flat top 19 which extends forwardly beyond the side walls 20. The forwardly projecting portion of the flat top 19 is provided with two threaded holes 21 which extend therethrough from the upper to the lower surfaces. The side walls 20 are connected by a front wall 22 which has a central thickened block 23 provided with a horizontally disposed threaded bore 24 located below the projecting portion of the top 19 and midway between the holes 21.

The upper rear end of the motor housing 10 is shaped to form a recess substantially square in cross section, open at its top and rear end, defined by the inner vertical wall 25, horizontal bottom 26, and parallel vertical side walls 27, 28. Projecting rearwardly from the center of the wall 25, into the motor housing recess, is a pin 29, which engages a part of the handle 12 as will be explained hereinafter.

The handle 12 preferably is formed of plastic material, hollow in opposite downturned end portions. The rear end 30 of the handle is provided with a hole extending horizontally through its inner wall to receive the pin 29 which projects from the motor housing wall 25 through said apertured handle wall 30 into the hollow interior of the rear end of the handle 12. The forward downturned end of the handle houses the switch mechanism including the wiring 31 and actuator 32. Blocks 34 are formed adjacent the opposite side walls 33 of the forward end of the handle, said blocks 34 having vertically disposed threaded bores 35 adapted to register with the holes 21 in the bracket 18 of the motor end cover 14 when the handle is in its intended position.

To assemble the described parts, the leads 31 from the motor field are connected to the switch mechanism (not shown), being passed from the motor housing through the U-shaped opening in the motor cover 14 into the bracket 18, between the side walls 20 and upwardly beyond the flat top 19 of the bracket. Next the rear end of the handle 12 is slipped into the recess formed in the upper rear portion of the motor housing 10, and by a slight forward movement of the handle the aperture in the handle wall 30 engages the pin 29 which projects from the motor housing wall 25 through said aperture and into the hollow handle. This engagement between pin 29 and apertured handle provides efficient concealed fastening means for connecting the rear end of the handle to the motor housing.

The switch mechanism including the wiring 31 and actuator 32 having previously been mounted in the forward portion of the handle, and the rear end of the handle having been engaged by the pin 29 as described, the parts are in position to seat the forward end of the handle on the flat surface 19 of the bracket 18, with the bores 35 of the handle registering with the holes 21, 21, in the bracket top. Two screws 36 are passed upwardly through the holes 21 and into the threaded bores 35 whereby the handle is securely fastened to the bracket 18 on the motor cover 14. The screws 36 are the only separate fastening means, not self-contained in the mixer structure, employed for fastening the handle to the power unit. Both the rear and front fastening means are entirely concealed.

After the screws 36 have been tightened, a gasket 37 (Fig. 6) is placed adjacent the exposed face of the motor cover 14, the gasket being cut away at 38 to fit neatly against the side walls 20 and under the top 19 of the bracket. Finally the gear housing 11 is positioned as shown in Fig. 1, the top of the housing being cut away as indicated at 39 to fit around the handle attachment bracket 18. A bolt 40 extends through the hole 41 in the face of the gear housing, with its threaded end engaging the threaded bore 24 of the part 23 of the bracket 18. The gear housing covers the handle attachment bracket 18 as well as the gearing (not shown) for driving the beater shafts 13.

From the foregoing description it will be apparent that the screw bolt 40 is the only exposed fastening means in the power unit; and that the means for fastening the handle to the motor casing and to the bracket 18, and for fastening the motor cover 14 to the motor housing 10 are completely concealed.

In describing the invention, reference has been made to a particular example embodying the same, but I wish it to be understood that the invention is not limited to the construction shown in the drawing, that the handle mounting may be applied to tools other than food mixers, and that various changes may be made in the construction and general arrangement of parts without departing from the invention.

I claim:

1. In combination with a motor driven power unit including a gear housing, a motor housing having a forward end cover between the motor and gear housing, and a handle, handle mounting means comprising a handle attachment bracket extending from the motor end cover into the gear housing, fastening means connecting the forward end of the handle and bracket, and concealed self-contained cooperating means on the rear portion of the motor housing and handle detachably connecting the rear end of the handle to the motor housing.

2. The handle mounting means defined by claim 1, in which the handle attachment bracket is provided with a threaded bore extending horizontally into its forward end for reception of a gear housing connecting bolt.

3. In combination with a motor driven power unit including a gear housing, a motor housing having a forward end cover between the motor and gear housing, and a handle hollow at its forward end, handle mounting means comprising a handle attachment bracket extending from the motor end cover into the gear housing, a flat upper surface extending laterally beyond the body of the bracket adapted to support the forward end of the handle, fastening means extending through said laterally extending portions of the bracket and into the handle for connecting the bracket and handle, and concealed self-contained cooperating means on the rear portion of the motor housing and handle detachably connecting the rear end of the handle to the motor housing.

4. In combination with a motor driven power unit including a gear housing, a motor housing having a forward end cover between the motor and gear housing, and a handle hollow at its forward end, handle mounting means comprising a handle attachment bracket extending from the motor end cover into the gear housing, a flat upper surface extending laterally beyond the body of the bracket adapted to support the forward end of the handle, the bracket having a hollow interior communicating with the motor housing through a recess in said end cover and with the hollow forward end of the handle for reception of leads from the motor to the handle, fastening means extending through said laterally extending portions of the bracket and into the handle for connecting the bracket and handle, and concealed self-contained cooperating means on the rear portion of the motor housing and handle detachably connecting the rear end of the handle to the motor housing.

5. The handle mounting means defined by claim 3, in which the handle attachment bracket is provided with a threaded bore extending horizontally into the forward end of the bracket beneath said laterally extending portions, for reception of a gear housing connecting bolt.

6. The handle mounting means defined by claim 4, in which the handle attachment bracket is provided with a threaded bore extending horizontally into the forward end of the bracket beneath said laterally extending portions and midway between the means connecting the bracket and handle, for reception of a gear housing connecting bolt.

7. In combination with a motor driven power unit including a gear housing, a motor housing having a forward end cover between the motor and gear housing, and a handle, handle mounting means comprising a handle attachment bracket extending from the motor end cover into the gear housing, fastening means connecting the forward end of the handle and bracket, an upwardly and rearwardly open recess in the rear end of the motor housing, a pin projecting from the motor housing into the recess, and an aperture in the rear end of the handle adapted to receive the pin and concealedly connect the rear end of the handle to the motor housing.

8. The handle mounting means defined by claim 3, in which the means for connecting the rear end of the handle to the motor housing comprises an upwardly and rearwardly open recess in the rear end of the motor housing, a pin projecting from the motor housing into the recess, and an aperture in the rear end of the handle adapted to receive the pin.

9. The handle mounting means defined by claim 4, in which the means for connecting the rear end of the handle to the motor housing comprises an upwardly and rearwardly open recess in the rear end of the motor housing, a pin projecting from the motor housing into the recess, and an aperture in the rear end of the handle adapted to receive the pin.

10. A motor driven food mixer comprising a gear housing, a motor housing, a forward end cover on the motor housing, a handle hollow at its forward end, a handle attachment bracket extending integrally forwardly from the motor end cover into the gear housing, said bracket having an internally hollow body communicating with the motor housing through a recess in the end cover, and communicating with the hollow handle through an opening in the top of the bracket, a handle supporting flat surface adjacent said opening in the top of the bracket, leads from the motor extending through said bracket body into the handle, fastening means connecting the bracket to the handle, a threaded bore extending into the forward portion of the bracket beneath said handle supporting surface, the upper wall of the gear housing being cut away to fit around the forward end of the handle, a bolt extending through the face of the gear housing into said threaded bore in the bracket and thereby connecting the gear housing to the motor end cover, an upwardly and rearwardly open recess formed in the rear end of the motor housing, a pin projecting from the motor housing into the recess, and an aperture in the rear end of the handle adapted to receive the pin and thereby concealedly fasten the handle to the motor housing.

No references cited.